United States Patent [19]
McNelis

[11] Patent Number: 5,544,129
[45] Date of Patent: Aug. 6, 1996

[54] METHOD AND APPARATUS FOR DETERMINING THE GENERAL DIRECTION OF THE ORIGIN OF A PROJECTILE

[75] Inventor: Niall B. McNelis, Baltimore, Md.

[73] Assignee: AAI Corporation, Hunt Valley, Md.

[21] Appl. No.: 298,178

[22] Filed: Aug. 30, 1994

[51] Int. Cl.⁶ .................................................... G01S 5/20
[52] U.S. Cl. .......................................... 367/127; 367/906
[58] Field of Search .................................... 367/127, 129, 367/906; 273/372; 235/400; 364/423

[56] References Cited

U.S. PATENT DOCUMENTS 2,966,657  12/1960  Price ........................................ 367/129
5,241,518   8/1993  McNelis et al. ......................... 367/127

Primary Examiner—Daniel T. Pihulic
Attorney, Agent, or Firm—Griffin, Butler, Whisenhunt & Kurtossy

[57] ABSTRACT

Methods and apparatus are provided for determining the general direction of the origin of a projectile. At least one sensor, having at least three spaced-apart transducers, each being capable of encountering a blast wave generated at an origin of and by a propellant for the projectile, is provided for generating a signal responsive thereto. From the signals, a time relation is measured between at least three transducers when the blast wave serially encounters each of the three transducers. From the time relations, at least one unit sighting vector from at least one sensor to the origin of the blast wave is determined so that the unit sighting vector points in the general direction of the origin of the projectile.

18 Claims, 5 Drawing Sheets

5,544,129

METHOD AND APPARATUS FOR DETERMINING THE GENERAL DIRECTION OF THE ORIGIN OF A PROJECTILE

The present invention relates to a method and apparatus for determining the general direction of the origin of a projectile, and particularly to such projectile emanating from unfriendly small arms fire, e.g. machine guns, rifles and pistols, as well as other launchers.

BACKGROUND OF THE INVENTION

The detection of the origin of unfriendly fire has become increasingly important in modern highly mobile combat situations where a fluid combat zone cannot easily geographically distinguish between friendly and unfriendly fire. A number of efforts have been made in the art to make distinctions between such fires, and the projectiles resulting therefrom, but these efforts have, from a practical point of view, been unsuccessful until the advent of the invention described in U.S. Pat. No. 5,241,518, commonly assigned herewith. That patent describes a method and apparatus for determining the trajectory of a supersonic projectile of unknown velocity and direction. In the apparatus, at least three spaced-apart sensors, each having at least three transducers, are capable of encountering a shock wave generated by a supersonic projectile passing in the vicinity of the sensors and capable of generating signals in response to that shock wave. Those signals, it was found, are related to the azimuth and elevation angle of a unit sighting vector from each sensor to the origin of the shock wave. The apparatus provides means, e.g. a computer, for calculating from the signals the azimuth and elevation angle of the unit sighting vector from each sensor to the origin of the shock wave and for calculating from the unit sighting vectors of each of the three sensors the azimuth and elevation angle of the local trajectory of the projectile. Of course, the shock wave is propagated by the projectile, and by measuring the time lapses of the shock wave in passing the transducers of the sensors, it was found possible to calculate the trajectory of that supersonic projectile.

For the foregoing purposes, the sensors of that apparatus (including the transducers) are sensitive to the shock wave produced by the supersonic projectile and are, particularly, sensitive to the shock front and the ambient density lines thereof. From the shock wave and ambient density lines, the length of the projectile can be calculated from the time lapse of the passage of the shock wave and the ambient density line over a sensor. By thus knowing the length of the projectile, as well as the trajectory, from known look-up tables of the projectile length and the characteristics of the gun from which the projectile is fired, e.g. a cannon, the actual origin (the gun) of that projectile can also be calculated.

While the foregoing is a very brief summary of that U.S. patent, it will be appreciated that the apparatus and method of that patent are applicable only to determining the above-described characteristics of a supersonic projectile. Further, it will be appreciated that the apparatus and method involved, while quite applicable to modern battlefield conditions, are expensive and somewhat complex, which might not be applicable to other than battle conditions, e.g. not applicable to local insurrection, sniper fire, assassin fire and the like.

An effort to define the direction of a pressure wave in a more simple manner is reported in United Kingdom Patent No. GB 2 246 861 B, where four pressure sensitive transducers are spaced about the surface of a sphere in a tetrahedral configuration, i.e. the positions of the four transducers on the surface of the sphere form the apices of a tetrahedron. The size of the sphere is, of course, relatively critical, since the size must be small enough to avoid disrupting the pressure wave pattern, but on the other hand, large enough to provide a reasonable time delay between the pressure wave's impingement on the separated four transducers. Thus, the sphere must also not be too small. Time intervals between the arrival of the pressure wave to pass each transducer are measured, which provides the velocity of the pressure wave, and the three direction cosines of the normal to the pressure wave. When the orientation of the sphere to the pressure wave is known, the direction cosines of the axis to each of the four transducers can be calculated, since the angle subtended by the normal to the pressure wave and to the center of the sphere can be determined.

This device, however, has a number of serious drawbacks: the sphere configuration must be used, which would be quite conspicuous on, for example, the roof of an automobile; the sphere can be easily blinded to the pressure wave, e.g. the sphere is on a trunk of an automobile and the pressure wave comes from the front of the automobile; the sphere can be easily destroyed by sniper fire; and the sphere must be oriented to the pressure wave. Thus, this device is not practical for use in the environments intended by the present invention.

It would, therefore, be of substantial advantage to the art to provide methods and apparatus which are applicable to determining the general direction of the origin of a projectile from unfriendly fire in other than battle conditions, such as those noted above. Thus, such apparatus and methods could be utilized, for example, to locate unfriendly sniper fire in close quarters, such as in towns and cities, or, likewise, the fire of criminals or assassins in such circumstances. By knowing the general direction of the origin of a unfriendly fired projectile, the location of the criminal, sniper or assassin can be determined for return suppressing fire.

BRIEF SUMMARY OF THE INVENTION

The present invention is based on several primary discoveries and several subsidiary discoveries. First of all, it has been found that sensors can be provided which have at least three spaced-apart transducers and each of the transducers are capable of encountering a blast wave generated at the origin of and by a propellant for the projectile, and those transducers can generate a signal responsive thereto. Thus, as opposed to the method and arrangement of the aforementioned U.S. patent, which makes calculations based on the shock wave and ambient density lines created by a supersonic projectile, the present invention is based on detection of the blast wave generated, for example, by the muzzle blast from the gun firing the projectile. Stated another way, the present invention is not based on data from the projectile itself, as is the aforementioned U.S. patent, but is based only on the data collected from the blast wave of, for example, the muzzle blast of the gun firing the projectile, e.g. the bullet.

As a second primary discovery, it was found that the signals generated by the transducers form time relations between the transducers when the blast wave serially encounters each of the three required transducers.

As a third primary discovery, it was found that from these time relations at least one unit sighting vector could be determined from at least one sensor to the origin of the blast wave and that the unit sighting vector will point in the general direction of the origin of the projectile.

As a subsidiary discovery, it was found that when there are at least two spaced-apart sensors and each generates a unit sighting vector, then those two unit sighting vectors may be used for determining by a triangulation calculation the general distance from the sensors to the origin of the projectile. Thus, by having not only the general direction of the origin of the blast wave from the sensors, but also having the general distance of the origin of the blast wave from the sensors, the location of the sniper, assassin, criminal, etc. can be very accurately determined for immediate and effective suppressing fire.

As a second subsidiary discovery, since in the case, for example, of sniper fire, a plurality of projectiles may be fired in a rapid fashion, it is important for accurate determination of the origin of the blast wave that blast waves from succeeding rapidly fired projectiles are not confused in calculating the unit sighting vector from the blast wave of the first or earlier fired projectile. To this end, a time limit is set between a signal generated by a transducer which first encounters the blast wave and a signal generated by transducers which subsequently encounter the blast wave. If that time limit is less than the time between succeeding fired projectiles from a rapid-fire gun or launcher, then the determination of the origin of the blast wave for a first projectile will be completed before a blast wave from a second or succeeding projectile will pass in the vicinity of the transducers or sensors.

As a further subsidiary discovery in this regard, the reception of signals from the transducers are so controlled so that those signals are reset, e.g. to zero, after that time limit has exceeded. By this method, even when rapid fire is encountered, the method and apparatus of the invention will still produce accurate general directions to the origin of the projectile and not be confused by multiple blast waves formed by rapid firing guns.

Thus, broadly stated, the present invention provides a method for determining the general direction of the origin of a projectile, comprising providing at least one sensor having at least three spaced-apart transducers, each capable of encountering a blast wave generated at an origin of and by a propellant for the projectile and generating a signal responsive thereto. Time relations between the at least three transducers are measured from the signals when the blast wave serially encounters each of the at least three transducers. From the time relations, at least one unit sighting vector is determined from at least one sensor to the origin of the blast wave so that the unit sighting vector points in the general direction of the origin of the projectile.

The apparatus, according to the present invention, very broadly stated, is for determining the general direction of the origin of a projectile comprising at least one sensor having at least three spaced-apart transducers, each being capable of encountering a blast wave generated at the origin of and by a propellant for the projectile and generating a signal responsive thereto. Measuring means are provided for measuring from the signals time relations between the at least three transducers when the blast wave serially encounters each of the at least three transducers. Calculation means, e.g. a computer, are provided for determining from the time relations at least one unit sighting vector from at least one sensor to the origin of the blast wave so that the unit sighting vector points in the general direction of the origin of the projectile.

BRIEF DESCRIPTION OF THE DRAWINGS

As a prologue to the brief description of the drawings, it is pointed out that the detailed apparatus described in the aforementioned U.S. Pat. No. 5,241,518 can be adapted to the present invention by selection of the transducers for the sensors and the parameters set in the computer used for performing the above-described calculations. Thus, for clarity purposes, the appropriate portions of the apparatus and drawings of U.S. Pat. No. 5,241,518 are used herein, and reference may be made to that patent for a further description thereof.

DESCRIPTION OF PREFERRED
EMBODIMENTS OF THE INVENTION

Figure 1:
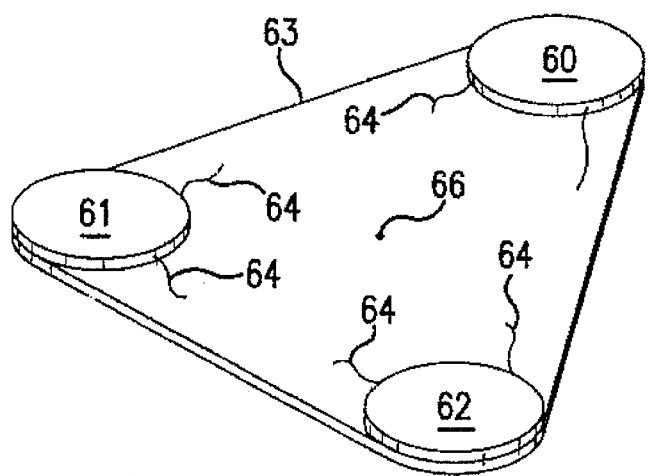
FIG. 1 is an illustration of a suitable sensor arrangement, which figure is essentially the same as FIG. 6 of the aforementioned patent.

Since much of the theory of the calculations carried out by the computer for generating the present unit sighting vector is described in considerable detail in U.S. Pat. No. 5,241,518, those theories of calculations will not be repeated in detail herein for sake of conciseness, and the disclosure of that patent is incorporated herein and relied upon by reference. However, basically, as shown in FIG. 1, each transducer 60, 61 and 62 (three being shown in FIG. 1) is mounted on a support 63 (discussed more fully hereinafter). The transducers may be any acoustical transducer capable of generating a signal in response to pressure on the transducer created by the blast wave encountering the transducer. The transducers may generate a light signal, an acoustical tone signal, an electrical signal or others, but commercially available piezoelectric crystals are quite convenient in this regard. For example, the transducers shown in FIG. 1 are such piezoelectric crystals made by Electro-Ceramics, and are 0.125 inch thick and 1 inch in diameter, although any other desired configuration thereof may be used. A wire 64 is soldered on each side of the crystals after the surface of the crystal is prepared with an abrasive material, such as Scotch Brite. The polarity of each crystal is noted so that each input to the crystal has the same polarity going to the detection electronics, explained below. A positive voltage output is produced during compression of the crystal by the blast wave. The crystals may be glued to the support 63 with an adhesive, such as a silicone-based adhesive, and, preferably, the support is a conventional shock-absorbent material, e.g. Isodamp. This material has acoustical dampening properties which are useful, as explained more fully below. The use of such shock-absorbent material is, however, not necessary but serves to increase the accuracy of the unit sighting vector determined by the invention. In close places, such as in city streets and the like, where unfriendly fire may come from a very close distance, that accuracy may not be required, and the transducers could be mounted on other surfaces, such as the roof, hood, fenders, doors or trunk of an automobile, which, therefore, become the sensor or plurality of sensors. Nevertheless, preferably the transducers are mounted on a support separate from any vehicle or other apparatus carrying the transducers, and the transducers are mounted on that support in a known geometry, e.g. an equilateral triangle with leg lengths of 3 inches or more, although any known geometry and any length of distances between crystals may be used. The equilateral triangle, however, simplifies the calculations for determining the unit sighting vector, and for that reason, the equilateral triangle is a preferred embodiment.

Figure 2:
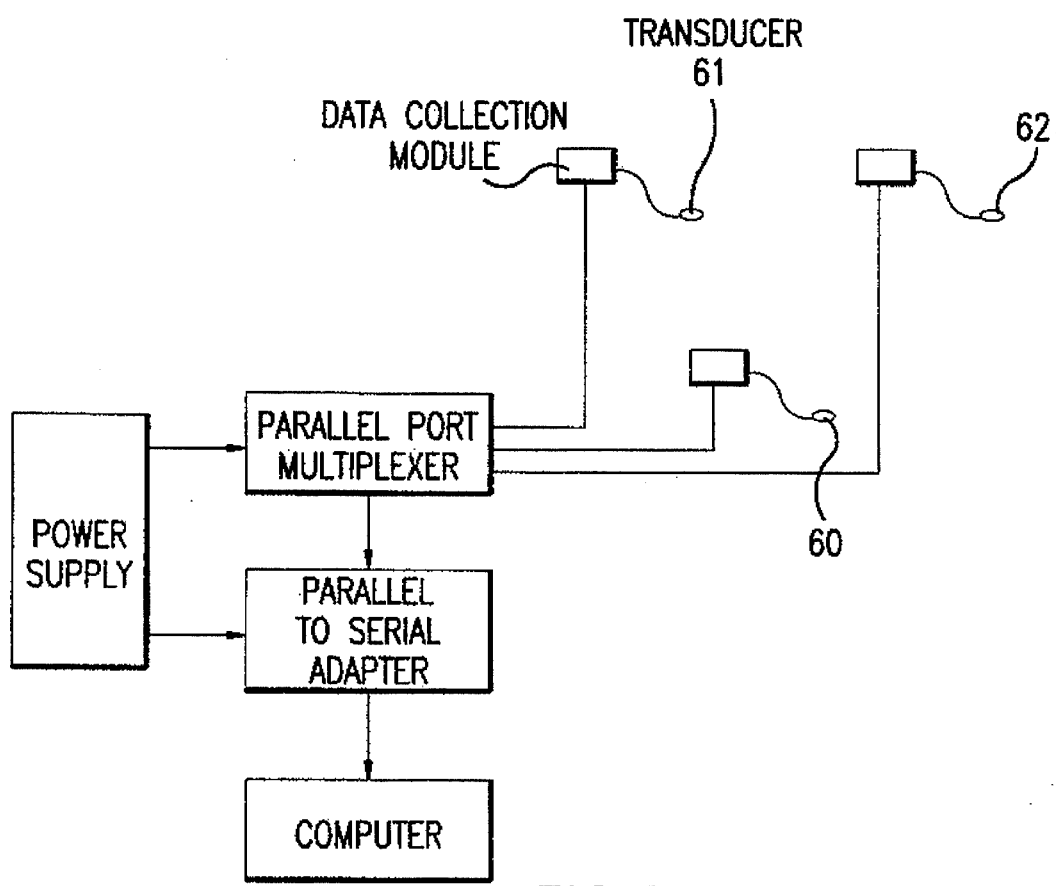
FIG. 2 is an illustration of a suitable apparatus arrangement, which figure is substantially the same as that of FIG. 7 of the aforementioned patent.

The six wires 64, two from each of the three transducers 60, 61 and 62 are inputted to a data collection module as shown in FIG. 2, with one data collection module for each transducer. The modules determine which transducer has the first hit by the blast wave, which transducer has the second hit by the blast wave and the time between the first hit and the second hit, as well as the time relation between the first hit and the last hit, etc. This information, or selected portions thereof, is fed to a computer for making the required calculations, as explained above, by any conventional devices, such as a parallel port multiplexer to a parallel-to-serial adapter, with associated required power supply, as also shown in FIG. 2. For example, this arrangement can accommodate twelve 8-bit parallel input ports and switch each, in turn, to a single 8-bit output parallel port. The output is fed through a parallel-to-serial adapter to the computer. All of the components of this arrangement, with the exception of the sensors, are commercially available and well known to the art. Hence, no further description thereof is necessary.

Once in the computer, the data is used in calculations to convert that data to a unit sighting vector pointing in the general direction of the origin of the blast wave. As briefly noted above, when there are at least two spaced-apart sensors of the general configuration, for example, shown in FIG. 1 (three shown in FIG. 1) and each of the two generates that unit sighting vector, then by triangulation calculations, of the so-generated unit sighting vectors, the general distance from the sensors to the origin of the blast wave, and, hence, the origin of the projectile, may also be determined. Triangulation formulae may be used in this regard, all of which is well known to the art, and no further explanation in regard thereto is required.

Thus, the computer takes the data from each transducer and/or sensor and makes the above-noted calculations to determine the general direction of the origin of the projectile and, with at least two sensors, the distance from the sensors to the origin of the projectile. For example, in the arrangement shown in FIG. 1, the origin of the vector will be central point 66 of the three transducers, since those transducers are in the preferred equilateral triangular form, with the full unit sighting vector of the transducers extending to the origin of the blast wave. That calculation, therefore, obtains the general direction of the origin of the projectile from the blast wave encountered by the transducers of the sensor. However, while this is convenient, only two sensors are required for making the distance calculation.

While the above describes a very useful and preferred embodiment of the invention, other means of measuring the time when the blast wave encounters each of the transducers may be used, and it is only necessary that some means be provided for measuring the time when the blast wave encounters each of the transducers, since, quite obviously, it is not the particular means but the measurement of time by those means which is important to the invention.

Likewise, any means for calculating from the measured time, the general direction or the distance (in the case of two sensors) of the projectile may be used. While the arrangement shown in FIG. 2 is quite satisfactory and a preferred embodiment, other arrangements for making the calculation may be used.

It will also be appreciated, especially in cities, towns and under sniper-fire conditions, that a great number of acoustical waves may be present. It is, therefore, important that the apparatus be capable of discriminating between background noise, causing other acoustical waves, and the blast wave created by the propellant for the projectile of interest. Thus, the sensors (and transducers) must be sensitive to a blast wave propagated by the detonating propellant for the projectile.

Conventional means are available for producing such sensitivity. For example, either the transducers or the data collecting module or the computer may be such that signals generated by the transducers will only be accepted by the computer when those signals have the known "fingerprint" pattern consistent with a blast wave, e.g. the rise and fall time pressure of the blast wave, as opposed to very different patterns for background noises. Alternately, a separate sensor, sensitive to a blast wave and insensitive to background noise may be used as a gate for delivering or interrupting transfer of signals from the sensors (transducers) to the computer.

As will also be appreciated, it is important to minimize "cross-talk" between transducers of a sensor or between sensors or between transducers individually disposed and grouped to constitute a sensor. For this purpose, it is preferable that the sensors/transducers be mounted on the acoustical material described above. However, where the transducers are spaced apart a considerable distance, e.g. three transducers spaced apart on the top of an automobile (forming a sensor), that "cross-talk" will be minimal, and under those conditions, acoustical dampening may not be necessary, especially when the method and apparatus are to be operated in close places, such as in cities and towns, where accuracy of the direction of origin of the projectile or the distance from the sensors to the origin of the projectile (when at least two sensors are used) is not as critical as in the case where those origins are much farther away from the sensors/transducers.

In regard to measuring from the signals the time relation between the at least three transducers when the blast wave serially encounters each of the at least three transducers, a usual computer clock can be used for this purpose. Alternatively, a separate timing device, many of which are known and conventional in the art and need not be described herein, may be used.

In regard to determining from the time relations at least one unit sighting vector from at least one sensor to the origin of the blast wave, or from at least two sensors the distance of the origin of the blast wave, it will be appreciated that, when a blast wave passes a first transducer, the pressure thereof generates a signal in that transducer, e.g. a piezoelectric device. Likewise, a signal will be generated from a second hit transducer by that blast wave, and, likewise, a signal will be generated by a third hit transducer by that blast wave. The time lapse between the hits of the three transducers is proportional to the azimuth and elevation angle of a unit sighting vector pointing in the general direction of the origin of the projectile. When the transducers are in an equilateral triangle configuration, as shown in FIG. 1, the origin of the vector will be at the point 66 of FIG. 1, and, thus, the calculation is considerably simplified. However, the calculation can be made irrespective of the configuration of the transducers for the sensors by geometrical calculations. It should be appreciated that, for example, an automobile may be provided with a plurality of transducers, e.g. 10, 20 or 50, spaced around the automobile and a group of three transducers form a sensor. The three grouped transducers forming a sensor need not be those immediately and sequentially hit by the wave and could be, for example, the first, fifth and tenth, depending on the positions thereof, which are more appropriate to the detected blast wave. The computer can be easily programmed to select a group of three (or groups of three) transducers to form a sensor (or plurality of sensors) by analysis of the blast wave received by all or part of the transducers.

Similarly, when there are two spaced-apart sensors, each generating such a unit sighting vector, triangulation calculations can be made for determining from the two so-generated unit sighting vectors the general distance from the sensors to the origin of the projectile. If desired, more than two sensors may be used for this purpose, e.g. three sensors as shown in FIG. 1. In this case, when the at least two sensors, each having three transducers (or groups of transducers), are in the configuration of an equilateral triangle, this calculation is also simplified, but, again, the calculation can be made whether or not the sensors are in an equilateral triangle configuration.

Many small arms fire subsonic projectiles, e.g. hand guns. The subsonic projectiles, of course, produce no shock wave from the projectile itself, and, thus, the only wave of significance which must be considered and datalized with the present invention is that blast wave. However, when the projectile is a supersonic projectile, that supersonic projectile, e.g. from high-powered rifles, also produces a shock wave in the vicinity of the travelling projectile, and that shock wave must be discriminated from the blast wave, or, otherwise, the apparatus may attempt to make calculations from the wrong pressure wave. Thus, a discrimination is made between the signals generated in response to the blast wave and signals generated by encountered shock waves of the supersonic projectile. This may be achieved in the manner described above in connection with the sensors in the description of discrimination with background noise, e.g. by the choice of the transducers or sensors themselves, such that they are sensitive only to the "fingerprint" of the blast wave, or by discriminating between the very distinctive pressure profile of the supersonic projectile and the pressure profile of a blast wave by usual electronic discrimination means, e.g. pattern matching.

As briefly noted above, especially in sniper fire, automatic rapid-firing weapons may be used. In order to prevent the apparatus from being confused between blast waves generated from a rapid-firing weapon, a time limit is set between a signal generated by a transducer which first encounters the blast wave and the signal generated by the transducers which subsequently encounter that blast wave. This time limit can be set, for example, by the usual parameters of a computer timing clock or of another timing device, in the same manner as described above. By setting that time limit to less than the time between succeeding projectiles fired from a rapid-fire weapon, the signals being acted on by the apparatus for making the calculation will be those signals generated by the blast wave of a single projectile, even though multiple projectiles are rapidly being fired. For example, conventional machine guns can fire only at a rate less than about 10 projectiles per second, i.e. one projectile every 1/10 second or every 100 milliseconds. Thus, by setting that time limit to, for example, no greater than 75 milliseconds, e.g. 25 milliseconds or less, it will be ensured that the signals being used for the present calculation will be generated from the blast wave of a single projectile, and this will eliminate any possible confusion of the apparatus in regard to the received blast waves.

For much the same reason as discussed above, it is also necessary for the apparatus to be reset to the "start" or "zero" position so that it can rapidly determine the origin of a succeeding number of separate projectiles. This is also done on a timing basis, and since modern computers can easily make the above-described calculations in a few milliseconds or less, by a usual computer analog program, the cycle of calculations can be set so those calculations are made and the apparatus reset to "start" or "zero" within a very short time. Conveniently, that reset, which is activated after the time limit is exceeded, is timed for the same time as that described above, i.e. less than the time between succeeding projectiles fired from a rapid-fire weapon, e.g. 75 milliseconds or less, although that reset time could be much shorter, e.g. 10 milliseconds or even a fraction of a millisecond. In any event, for the above purposes, the reception of the signals for determining the time relations is periodically reset, as described above, in order to provide the ability to the apparatus for rapidly determining the origin of multiple rapidly-fired projectiles.

In regard to the apparatus of the invention, the apparatus has at least one sensor having at least three spaced-apart transducers, each being capable of encountering a blast wave generated at a origin of and by a propellant for the projectile and generating a signal responsive thereto, as explained above. Measuring means for measuring from the signals time relations between the at least three transducers when the blast wave serially encounters each of the at least three transducers is provided, and that measuring means may be as described above, e.g. the computer clock or other timing device.

A calculation means for determining from the time relations the at least one unit sighting vector from the at least one sensor to the origin of the blast wave may be any conventional computer programmed for the above-described triangulation calculation based on the signals and time lapses therebetween received from the transducers/sensors.

Again, when there are at least two spaced-apart sensors and each is capable of generating a unit sighting vector, the triangulation means may be a computer, and the computer determines by triangulation calculations of the so-generated unit sighting vectors the general distance from the sensors to the origin of the projectile, in the same manner as described above in connection with the direction of the origin of the projectile.

Likewise, the discrimination means for discriminating between a projectile which is a supersonic projectile can be those as described above, i.e. the detection of the "fingerprint" pattern or the selection of the transducer, e.g. the piezoelectric element. The discrimination means discriminates between the signals generated in response to the blast wave and signals generated by encountered shock waves of the supersonic projectile. With such discrimination, any signals which would otherwise be generated by the supersonic projectile are excluded from the signals being processed for the appropriate calculations, e.g. origin or distance.

The timing means for setting the time limit between a signal generated by a transducer which first encounters the blast wave and a signal generated by transducers which subsequently encounter the blast wave may be as described above, e.g. the usual computer time clock or other like conventional device, and especially such clock or device is set such that the time limit is less than the time between succeeding projectiles fired from a rapid-fire weapon, especially less than 75 milliseconds.

Similarly, the reset means which are provided to reset reception of the signals for determining the time relation can be the usual computer clock or a separate device, as described above, all of which is very well known to the art and readily available. In any event, the reset means resets the reception of the signals after the time limit is exceeded.

From the above, and in consideration of the disclosure of U.S. Pat. No. 5,241,518 briefly described above, it will be seen that the apparatus of that patent can be utilized for carrying out the function of the present method and for forming the present apparatus, when selective parts of that apparatus of that patent are utilized. Significant differences, however, are that as opposed to the method and apparatus described in that patent where the shock wave generated by the supersonic projectile is utilized for calculation purposes, the present invention discriminates such that those shock waves are eliminated from data collection or the calculation and the calculation is based on the blast wave. Of course, by basing the calculation on the blast wave, it is, therefore, impossible to determine with the present invention the parameters determined by the apparatus and method of that patent, i.e. the trajectory of a supersonic projectile, the length of a projectile, the specific origin of the projectile, and the miss distance of that projectile from the sensors. It would seem, therefore, that the present invention is a substantial step backward in the art, but this is not the case. With the present invention, the apparatus, required calculations, and complexity of calculations are considerably reduced, making the present apparatus considerably less expensive and considerably more easily operated by less trained personnel. In addition, the present invention can operate in close quarters, such as cities and towns, with effective accuracy. However, probably the most important distinction is that the present invention can determine the origin and distance of a subsonic projectile, e.g. low-powered small arms fire.

Figure 3:
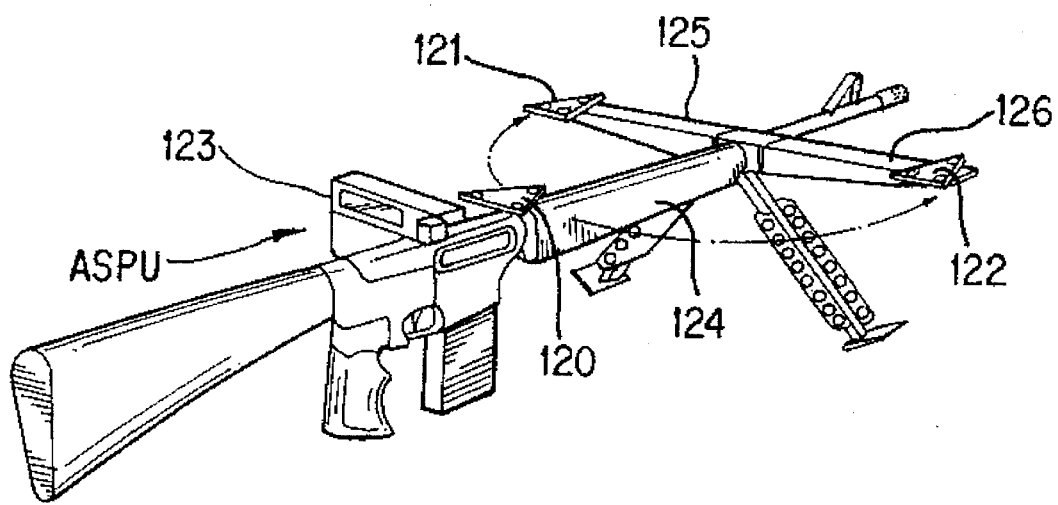
FIG. 3 is an illustration of the present apparatus as may be deployed on a gun, which figure is the same as FIG. 12 of the aforementioned patent
Figure 4:
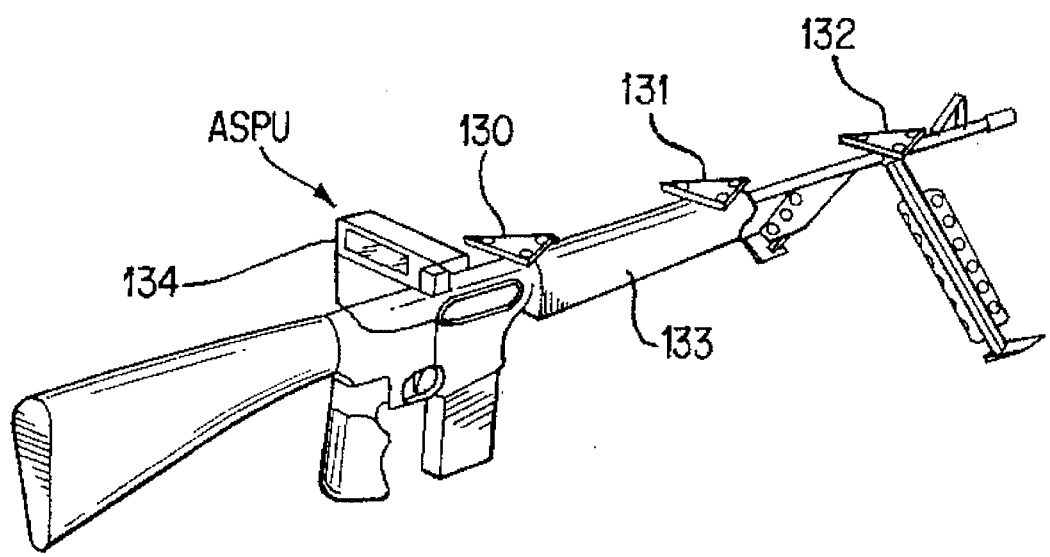
FIG. 4 shows an alternate disposition of the present sensors on a rifle, which figure is the same as FIG. 13 of the aforementioned patent.

While the apparatus of the invention may be disposed on any particular piece of equipment, such as an automobile, armored personnel carrier, or the like, it may also be disposed on weapons used for protection, such as those shown in FIGS. 3 and 4. As shown in FIG. 3, three sensors 120, 121 and 122 may be mounted on a rifle (only two are required for distance determination), along with the appropriate data processing unit 123, referred to as an acoustical signal processing unit (ASPU). One of the sensors is mounted on the barrel 124 of the rifle, while one or two (as shown in the drawing) are mounted on retractable sensor arms 125 and 126. This provides sensors for determining both the general direction of the origin of the projectile and the general distance of the origin of the projectile.

Alternatively, FIG. 4 shows an acceptable, but less desirable, embodiment, as opposed to FIG. 3, where three (only two are required for distance determination) sensors 130, 131 and 132 are mounted on barrel 133 of a rifle. Obviously, if the blast wave comes along the line of the sensors or very close to that line of sensors, then the present distance calculations by the data processing unit 134 (ASPU) will not be possible.

Figure 5:
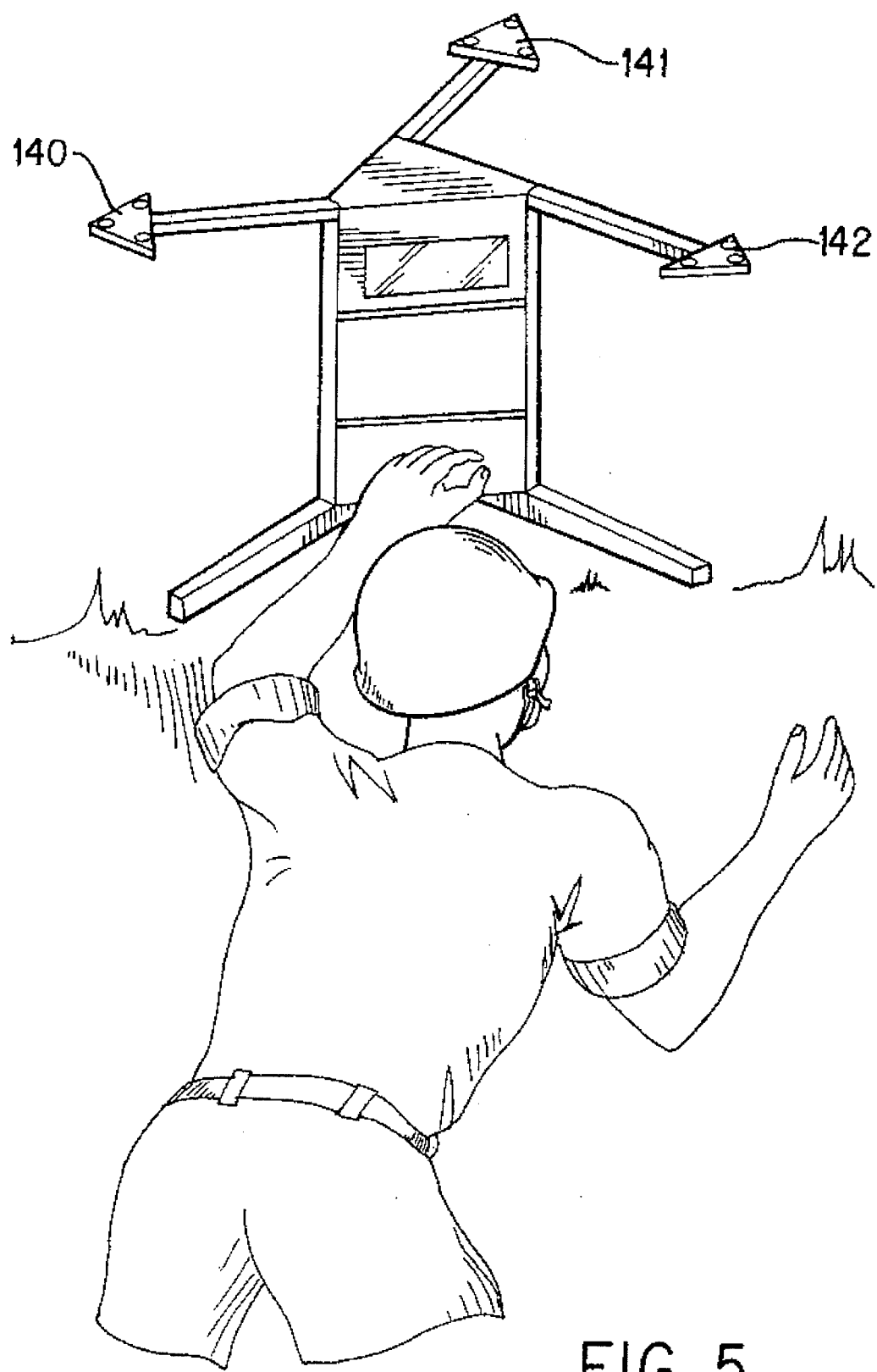
FIG. 5 shows the present sensors disposed on a portable device, which figure is the same as FIG. 14 of the aforementioned patent.

FIG. 5 shows another application where a portable unit is provided having sensors 140, 141 and 142 such that, for example, a protecting military person may determine the direction of sniper or assassin fire.

Of course, the architecture of installation of the sensor(s) or transducers will depend upon the particular equipment upon which they are placed, bearing in mind practical application of such placing. When the sensors or transducers are mounted on a motorized vehicle, for example a car, they should be mounted on the vehicle's surface and physically isolated from the vehicle-induced noise, using standard high hysteresis shock insulation techniques and materials. For example, when a plurality of transducers are mounted on the roof and other parts of an automobile so that a blast wave can be detected from any direction, that plurality of transducers could cause confusion in the calculations. To avoid this, in such installations, the computer can be gated so that only a selected number of transducers or the data therefrom will be addressed for calculation purposes, e.g. only the first three "hits" for determining the origin of the projectile and only the first six "hits" for determining the origin and distance. However, as noted above, the transducers grouped to form a sensor need not be those sequentially hit, but may be selected on the basis of longer distances apart for grouping into a sensor, e.g. the third, tenth and twelfth hit transducers. The activated transducers, or the data accepted by the computer from those transducers, are identified as to the specific transducers involved and their spacial arrangement on the automobile is known. Hence, the distance between the selected transducers is known for calculation purposes, as described above.

The ASP unit contains the necessary conventional timing circuits, discrimination circuits and computational algorithms to establish the projectile origin and distance (in the case of three sensors), as explained above.

Thus, the present invention provides a very accurate and easily achievable means and method of determining the origin and/or the distance of a projectile from the blast wave of the detonating propellant. The apparatus consists of components which are commercially available and can be assembled into a wide variety of configurations for a wide range of applications, as explained above. The apparatus is relatively inexpensive to build and easy to operate, which is necessary for the special conditions described above. Accordingly, the invention provides a considerable advance in the art.

While the calculations described above can be performed by the analogs described in the above-mentioned U.S. patent, since the present calculations can be considerably simplified, as noted above, the following shows simplified mathematics for producing the appropriate analogs.

It is assumed that the sensor is far enough away from the source of the blast wave, and that the transducer spacing in the sensors is small enough so as the leading front of the blast wave can be taken as a plane wave in the vicinity of the transducers. $\vec{U}_1$, $\vec{U}_2$ and $\vec{U}_3$ are vectors from each of the respective transducers normal the incident blast plane. The length of each of these vectors is the distance from each transducer to the plane. The time that the blast plane will take to reach the individual transducers are $t_1$, $t_2$, and $t_3$, respectively. Thus:

$$|\vec{U}_1| = t_1 V_s$$

$$|\vec{U}_2| = t_2 V_s$$

$$|\vec{U}_3| = t_3 V_s$$

Figure 6:
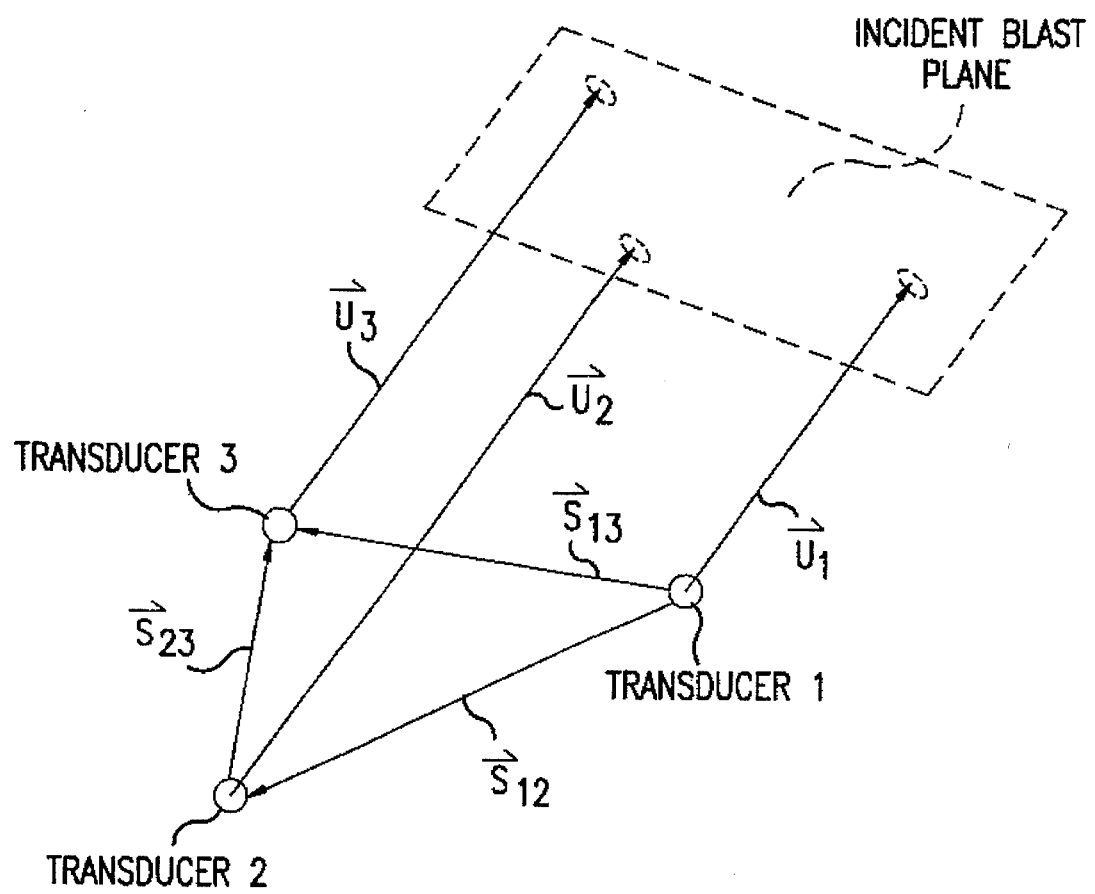
FIG. 6 is a diagram illustrating simplified mathematics useful for making the required calculations according to the present invention.

Note that $\vec{U}_1$, $\vec{U}_2$ and $\vec{U}_3$ are parallel; and, therefore, each of their unit vectors are equal. This unit vector is labelled $\vec{u}$; the quantity is "Sensor Unit Sighting Vector". By referring to FIG. 6, it is observed that the following relationships hold:

$$\vec{S}_{12} \cdot \vec{u} = \vec{U}_2 - \vec{U}_1 = (t_2 - t_1) V_s = \Delta t_{12}$$

$$\vec{S}_{13} \cdot \vec{u} = \vec{U}_3 - \vec{U}_1 = (t_3 - t_1) V_s = \Delta t_{13}$$

$$\vec{S}_{23} \cdot \vec{u} = \vec{U}_3 - \vec{U}_2 = (t_3 - t_2) V_s = \Delta t_{23}$$

The terms $\Delta t_{12}$, $\Delta t_{13}$ and $\Delta t_{23}$ are the arrival difference time between transducers 1 and 2 ($t_2-t_1$), etc. $V_s$ is the velocity of sound. $S_{12}$, $S_{13}$ and $S_{23}$ are the transducer spacing vectors. By picking the coordinate system such that all the transducers lie in the X-Y plane, none of the spacing vectors have a Z-component. Thus, only two of these equations need be solved. The first two are selected. The following terms are the derived components of the unit sighting vector and are used for a simplified analog for computer computation:

$$u_x = \frac{-\Delta t_{13} S_{12y} + \Delta t_{12} S_{13y}}{-S_{12y} S_{13x} + S_{12x} S_{13y}}$$

$$u_y = \frac{-\Delta t_{13} S_{12x} + \Delta t_{12} S_{13x}}{-S_{12y} S_{13x} + S_{12x} S_{13y}}$$

$$u_z \approx (1 - u_x^2 + u_y^2)^{1/2}$$

EXAMPLE

Figure 7:
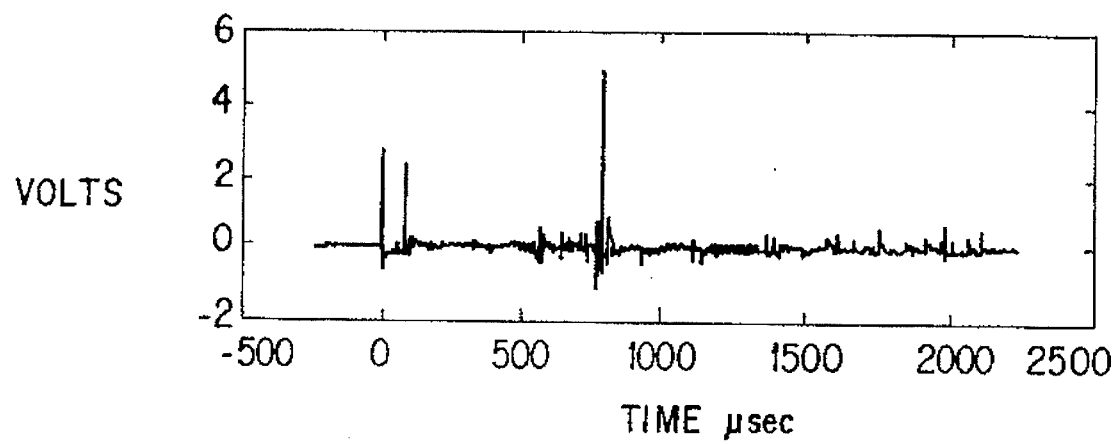
FIGS. 7 and 8 are traces of test results firing supersonic bullets, as described in the Example.

FIG. 7 is a trace of the blast wave intercepted by a PCB linear transducer set 3 feet from and 1 foot to the side of a muzzle blast. The ordinate is in volts generated from the transducer and the abscissa is the time in microseconds.

Figure 8:
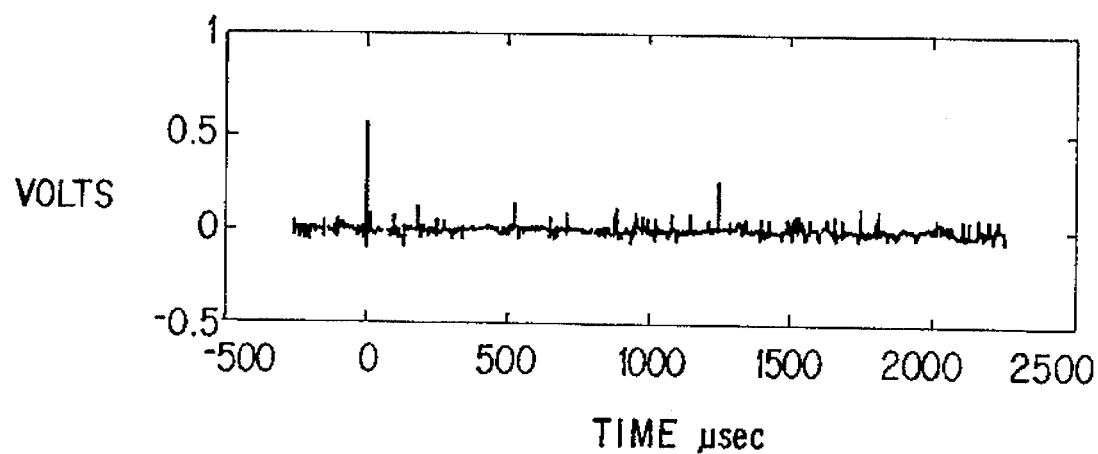

FIG. 8 is the same, except the transducer was set 30 feet from and 0 feet to the side of the muzzle blast, i.e. in the direction of the muzzle blast.

As can be seen from FIG. 7, the first two peaks are at about zero time from the muzzle blast and represent the shock wave of the supersonic bullet. It is these two very definitive peaks which must be discriminate, as explained above.

However, as shown in FIG. 8, the two peaks shock wave is not detected, but only the blast wave at slightly more than zero time. Thus, in some cases the discrimination is critical and in others not critical.

In FIG. 7, the blast wave is at about 750 microseconds and in FIG. 8 at slightly above 0 microseconds, which illustrates the difference in time when the transducer is not in the direct path of the bullet (FIG. 7) and when it is (FIG. 8).

In either case of FIGS. 7 or 8, it will be seen that the blast wave has a very identifiable "fingerprint", and on this basis, the discriminations discussed above can be made so that the origin and distance of a subsonic projectile may be determined.

Accordingly, it will be seen that from the units u of the above mathematics, the azimuth and elevation angle of the unit sighting vector(s) can be calculated, in the manner described in the above-noted U.S. patent in a simplified and easy manner.

What is claimed is:

1. A method for determining the general direction of the origin of a projectile, comprising:

(A) providing at least one sensor having at least three spaced-apart transducers, each being capable of encountering a blast wave generated at an origin of and by a propellant for the projectile and generating a signal responsive thereto;

(B) measuring from the signals a time relation between at least three transducers when the blast wave serially encounters each of the at least three transducers; and (C) determining from the time relations at least one unit sighting vector from at least one sensor to the origin of the blast wave so that the unit sighting vector points in the general direction of the origin of the projectile.

2. The method of claim 1, wherein there are at least two spaced-apart sensors and each generates said unit sighting vector, and determining by triangulation of the so-generated unit sighting vectors the general distance from the sensors to the origin of the projectile.

3. The method of claim 1, wherein the projectile is a supersonic projectile and a discrimination is made between the signals generated in response to the blast wave and signals generated by encountered shock waves of the supersonic projectile.

4. The method of claim 1, wherein a time limit is set between a signal generated by a transducer which first encounters the blast wave and a signal generated by transducers which subsequently encounter the blast wave.

5. The method of claim 1, wherein the time limit is less than the time between succeeding projectiles fired from a rapid-fire weapon.

6. The method of claim 5, wherein the time limit is not greater than 75 milliseconds.

7. The method of claim 4, wherein reception of the signals for determining the time relations is periodically reset.

8. The method of claim 7, wherein the reception of signals is reset after the time limit is exceeded.

9. The method of claim 1, wherein the time relations and unit sighting vector are calculated by a computer.

10. An apparatus for determining the general direction of the origin of a projectile, comprising:

(A) at least one sensor having at least three spaced-apart transducers, each being capable of encountering a blast wave generated at an origin of and by a propellant for the projectile and generating a signal responsive thereto;

(B) measuring means for measuring from the signals a time relation between the at least three transducers when the blast wave serially encounters each of the at least three transducers; and (C) calculation means for determining from the time relations at least one unit sighting vector from at least one sensor to the origin of the blast wave so that the unit sighting vector points in the general direction of the origin of the projectile.

11. The apparatus of claim 10, wherein there are at least two spaced-apart sensors and each is capable of generating said unit sighting vector, and triangulation means are provided for determining by triangulation of the so-generated unit sighting vectors the general distance from the sensors to the origin of the projectile.

12. The apparatus of claim 10, wherein the projectile is a supersonic projectile and discrimination means are provided to discriminate between the signals generated in response to the blast wave and signals generated by encountered shock waves of the supersonic projectile.

13. The apparatus of claim 10, wherein timing means are provided to set a time limit between a signal generated by a transducer which first encounters the blast wave and a signal generated by transducers which subsequently encounter the blast wave.

14. The apparatus of claim 10, wherein the time limit is less than the time between succeeding projectiles fired from a rapid-fire weapon.

15. The apparatus of claim 14, wherein the time limit is no greater than 75 milliseconds.

16. The apparatus of claim 13, wherein reset means are provided to reset reception of the signals for determining the time relations.

17. The apparatus of claim 16, wherein the reset means resets the reception of signals after the time limit is exceeded.

18. The apparatus of claim 10, wherein the time relations and unit sighting vector are calculated by a computer.

\* \* \* \* \*